United States Patent
Badeau et al.

(10) Patent No.: US 12,013,373 B2
(45) Date of Patent: Jun. 18, 2024

(54) FREE-ENCODER POSITIONING SYSTEM USING ACOUSTIC FEATURES AND IMU

(71) Applicant: Evident Canada, Inc., Québec (CA)

(72) Inventors: Nicolas Badeau, Quebec (CA); Benoit Lepage, L'Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 223 days.

(21) Appl. No.: 17/650,095

(22) Filed: Feb. 7, 2022

(65) Prior Publication Data

US 2022/0341885 A1   Oct. 27, 2022

Related U.S. Application Data

(60) Provisional application No. 63/178,698, filed on Apr. 23, 2021.

(51) Int. Cl.
*G01N 29/265* (2006.01)
*G01N 29/07* (2006.01)

(52) U.S. Cl.
CPC .......... *G01N 29/265* (2013.01); *G01N 29/07* (2013.01); *G01N 2291/0289* (2013.01); *G01N 2291/2698* (2013.01)

(58) Field of Classification Search
CPC ................. G01N 29/265; G01N 29/07; G01N 2291/0289; G01N 2291/2698; G01N 2291/011; G01N 2291/106; G01N 2291/2638; G01N 2291/267; G01N 29/2406; G01N 29/262; G01N 29/043
See application file for complete search history.

(56) References Cited

U.S. PATENT DOCUMENTS

| | | | |
|---|---|---|---|
| 6,397,681 B1 * | 6/2002 | Mizunoya | G01N 29/0645 73/620 |
| 7,324,910 B2 | 1/2008 | Struempler et al. | |
| 8,770,028 B2 | 7/2014 | Kleinert | |
| 2014/0290368 A1 * | 10/2014 | Guo | G01N 29/2481 73/602 |

FOREIGN PATENT DOCUMENTS

EP   2162737 B1   3/2012

* cited by examiner

*Primary Examiner* — Tarun Sinha
(74) *Attorney, Agent, or Firm* — Schwegman Lundberg & Woessner, P.A.

(57) ABSTRACT

Using various techniques, a position of a probe assembly of a non-destructive inspection system, such as a phase array ultrasonic testing (PAUT) system, can be determined using the acoustic capability of the probe assembly and an inertial measurement unit (IMU) sensor, e.g., including a gyroscope and an accelerometer, without relying on a complex encoding mechanism. The IMU sensor can provide an estimate of a current location of the probe assembly, which can be confirmed by the probe assembly, using an acoustic signal. In this manner, the data acquired from the IMU sensor and the probe assembly can be used in a complementary manner.

18 Claims, 9 Drawing Sheets

FREE-ENCODER POSITIONING SYSTEM USING ACOUSTIC FEATURES AND IMU

CLAIM OF PRIORITY

This application claims the benefit of priority of U.S. Provisional Patent Application Ser. No. 63/178,698, titled "FREE-ENCODER POSITIONING SYSTEM USING ACOUSTIC FEATURES AND IMU" to Nicolas Badeau et al., filed on Apr. 23, 2021, the entire contents of which being incorporated herein by reference.

FIELD OF THE DISCLOSURE

This document pertains generally, but not by way of limitation, to non-destructive testing and inspection devices (NDT/NDI).

BACKGROUND

Some non-destructive inspection systems, such as phase array ultrasonic testing (PAUT), can generate an image of what is inside the material under test, e.g., components or parts. Inspection of complex components or parts by non-destructive inspection can be quite challenging as finding and sizing a flaw or defect depends heavily on probe positioning during inspection. To generate an accurate image, the inspection system should know the position of its probe assembly relative to the material under test.

Many non-destructive inspection systems use mechanical systems to encode the position and the movement of the probe assembly. For example, a two-axis encoding system can be used to inspect a straight tube, with a separate encoder for each axis. With such a two-axis encoding system, the non-destructive inspection system can determine the position of the probe assembly using the knowledge that a straight tube is under inspection. However, such a two-axis encoding system can only be used to inspect a straight tube, for example.

Complex encoding mechanisms are often necessary for corrosion or weld inspection. For example, shaped components such as nozzles, elbows, and the like can require an encoding system different than that used for inspecting straight tubes.

SUMMARY OF THE DISCLOSURE

Using various techniques of this disclosure, a position of a probe assembly of a non-destructive inspection system, such as a phase array ultrasonic testing (PAUT) system, can be determined using the acoustic capability of the probe assembly and an inertial measurement unit (IMU) sensor, e.g., including a gyroscope and an accelerometer, without relying on a complex encoding mechanism. The IMU sensor can provide an estimate of a current location of the probe assembly, which can be confirmed by the probe assembly, using an acoustic signal. In this manner, the data acquired from the IMU sensor and the probe assembly can be used in a complementary manner.

In some aspects, this disclosure is directed to a method of estimating a position of a probe assembly of a non-destructive inspection system, the probe assembly positioned on a material and in communication with an inertial measurement unit (IMU) sensor, the method comprising: acquiring, at a first position of the probe assembly, a first acoustic data signal of the material using the probe assembly; acquiring, at a second position of the probe assembly, a second acoustic data signal of the material using the probe assembly; determining a first estimate of a displacement of the probe assembly between the first and second positions using the first and second acoustic data signals; determining a second estimate of the displacement of the probe assembly between the first and second positions using a signal from the IMU sensor; combining the first and second estimates of displacements; estimating, using the combination, a motion of the probe assembly; and generating, using the estimated motion, the second position of the probe assembly.

In some aspects, this disclosure is directed to an ultrasound inspection system for estimating a position of an ultrasonic probe assembly of a non-destructive inspection system, the system comprising: the ultrasonic probe assembly to be positioned on a material and in communication with an inertial measurement unit (IMU) sensor; and a processor configured to: acquire, at a first position of the probe assembly, a first acoustic data signal of the material using the probe assembly; acquire, at a second position of the probe assembly, a second acoustic data signal of the material using the probe assembly; determine a first estimate of a displacement of the probe assembly between the first and second positions using the first and second acoustic data signals; determine a second estimate of the displacement of the probe assembly between the first and second positions using a signal from the IMU sensor; combine the first and second estimates of displacements; estimate, using the combination, a motion of the probe assembly; and generate, using the estimated motion, the second position of the probe assembly.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Complex encoding mechanisms are often necessary for corrosion or weld inspection of irregularly shaped components such as nozzles, elbows, and the like. Such an encoding system can be different than that used for inspecting straight tubes due to the geometries of the components being inspected. Each shaped component can require a different encoding mechanism. For example, an encoding system for a nozzle is likely different than an encoding system for an elbow.

The present inventors have recognized that eliminating the need for using complex encoding systems, or even relatively simple encoding systems such as the Mini-Wheel™ encoder available from Olympus, can reduce inspection complexity and time. The present inventors have recognized the need for a technique to track a position of a probe assembly of a non-destructive inspection system, such as a phase array ultrasonic testing (PAUT) system, relative to the component or material being inspected.

Using various techniques of this disclosure, a position of a probe assembly of a non-destructive inspection system, such as a phase array ultrasonic testing (PAUT) system, can be determined using the acoustic capability of the probe assembly and an inertial measurement unit (IMU) sensor, e.g., including a gyroscope and an accelerometer, without relying on a complex encoding mechanism. As described in detail below, the IMU sensor can provide an estimate of a current location of the probe assembly, which can be confirmed by the probe assembly, using an acoustic signal. In this manner, the data acquired from the IMU sensor and the probe assembly can be used in a complementary manner.

Figure 1:
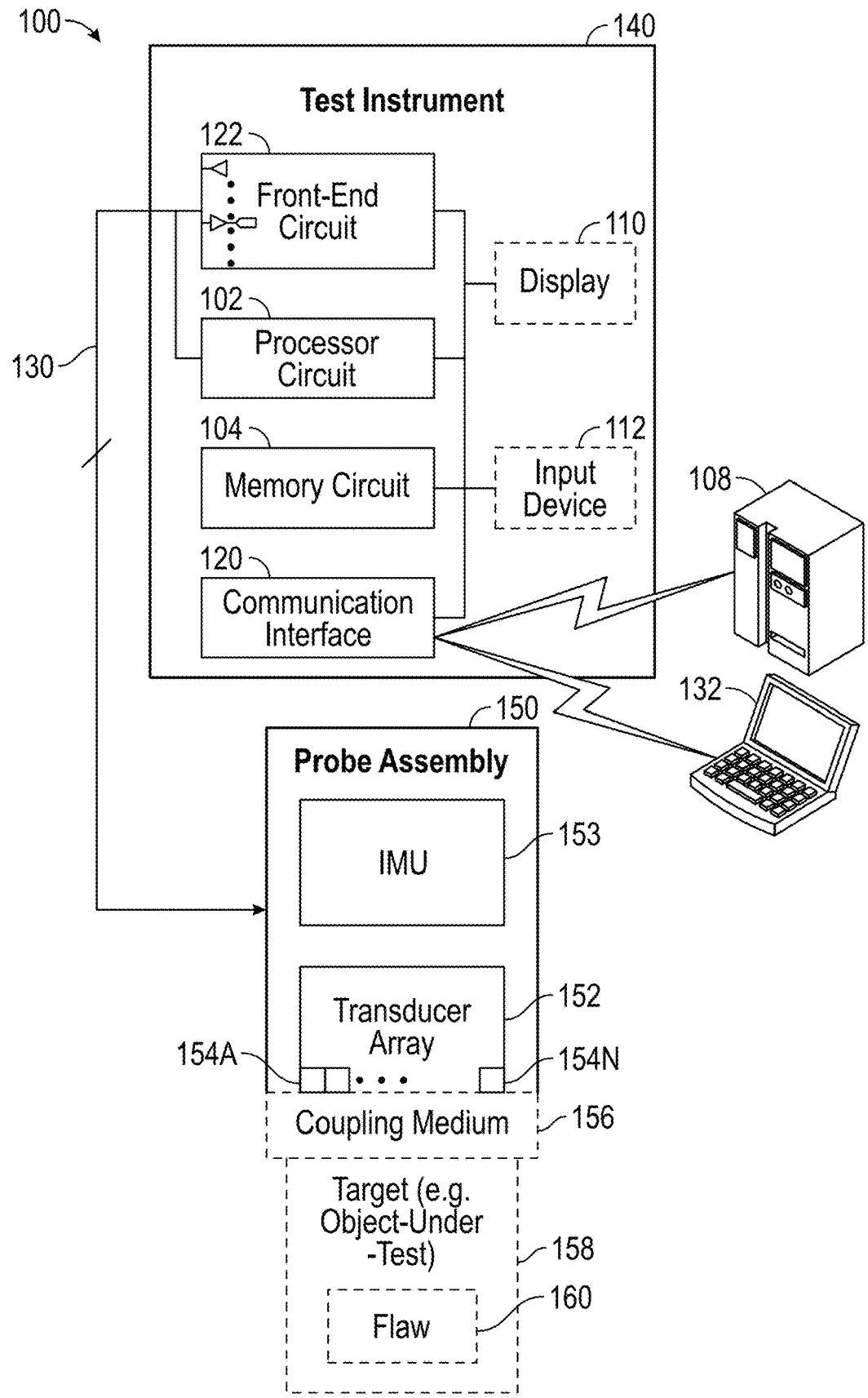
FIG. 1 illustrates generally an example of an acoustic inspection system, such as can be used to perform one or more techniques described herein.

FIG. 1 illustrates generally an example of an acoustic inspection system 100, such as can be used to perform one or more techniques described herein. The acoustic inspection system 100 can perform ultrasonic NDT techniques. The acoustic inspection system 100 of FIG. 1 is an example of an acoustic imaging modality, such as an acoustic phased array system, that can implement various techniques of this disclosure.

The inspection system 100, e.g., an ultrasound inspection system, can include a test instrument 140, such as a hand-held or portable assembly. The test instrument 140 can be electrically coupled to a probe assembly, such as using a multi-conductor interconnect 130. The electrical coupling can be a wired connection or a wireless connection. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

In some examples, the probe assembly 150 can include an inertial measurement unit (IMU) sensor 153, e.g., including a gyroscope and an accelerometer, e.g., an encoder or device, to implement encoder-like functions. The IMU sensor 153 can be a micro-electromechanical system (MEMS) device, for example. The gyroscope of the IMU sensor 153 can provide information of an angle of the probe assembly 150 and the accelerometer can provide information of an acceleration of the probe assembly 150. In some examples, the IMU sensor 153 can be integrated with the probe assembly 150. In other examples, the IMU sensor 153 can be a separate component affixed to the probe assembly 150. As described in detail below, the IMU sensor 153 can provide an estimate of a current location of the probe assembly 150, which can be confirmed by the probe assembly 150, using an acoustic signal.

A modular probe assembly 150 configuration can be used, such as to allow a test instrument 140 to be used with various probe assemblies 150. In a non-limiting example, the transducer array 152 can include piezoelectric transducers, such as can be acoustically coupled to a target 158 (e.g., an object under test) through a coupling medium 156. In other examples, capacitive micromachined ultrasonic transducer (CMUT) arrays can be used. The coupling medium can include a fluid or gel or a solid membrane (e.g., an elastomer or other polymer material), or a combination of fluid, gel, or solid structures. The wedge structures can include a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

Although FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a computing facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit 102 can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a computing facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of data or intermediate data such as A-line matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

The acoustic inspection system 100 can acquire acoustic data, such as using FMC, half matrix capture (HMC), virtual source aperture (VSA), or plane wave imaging, of a material using an acoustic acquisition technique, such as an acoustic phased array system. The processor circuit 102 can then generate an acoustic data set, such as a scattering matrix (S-matrix), plane wave matrix, or other matrix or data set, corresponding to an acoustic propagation mode, such as pulse echo direct (TT), self-tandem (TT-T), and/or pulse echo with skip (TT-TT).

To generate an image, an acoustic inspection system, such as the acoustic inspection system 100 of FIG. 1, can use inspection parameters and generation parameters. Inspection parameters need to be known, such as by being input by an operator before a scan begins, without regards to the final acoustic image to be generated. Inspection parameters can include the following: A-scan start (time at the first sample data), sample time resolution, frequency of probe, number of element in probe, and other characteristic of the probe such as element size, pitch, and bandwidth of the probe.

Generation parameters and many inspection parameters are used to generate an acoustic image from the acoustic data. Generation parameters can include selected acoustic mode, nominal thickness of part, acoustic velocities of different mode (pressure wave, shear wave, Rayleigh wave) in the different material (part, wedge), and a region of interest (size, position, and/or resolution). An acoustic image, such as a TFM image, can be generated using at least one generation parameter and first acoustic data, such as FMC data, where the first acoustic data can be acquired at least in part by an acoustic acquisition technique, such as an acoustic phased array system.

In accordance with this disclosure, the system 100 of FIG. 1 can implement various techniques of this disclosure, including estimating a position of a probe assembly of a non-destructive inspection system, where the probe assembly is positioned on a material and in communication with an IMU sensor. The IMU sensor can provide an estimate of a current location of the probe assembly, which can be confirmed by the probe assembly, using an acoustic signal. In this manner, the data acquired from the IMU sensor and the probe assembly can be used in a complementary manner to refine an estimated position of the probe assembly.

The system 100 can use the estimated position of the probe assembly relative to the material under inspection along the scan axis in order to determine the size of the features, e.g., areas of corrosion, length of flaw, etc. Using the estimated position, the system 100 can accurately display, such as on the display 110, an image that represents the acquired acoustic data depicting the features.

Figure 2:
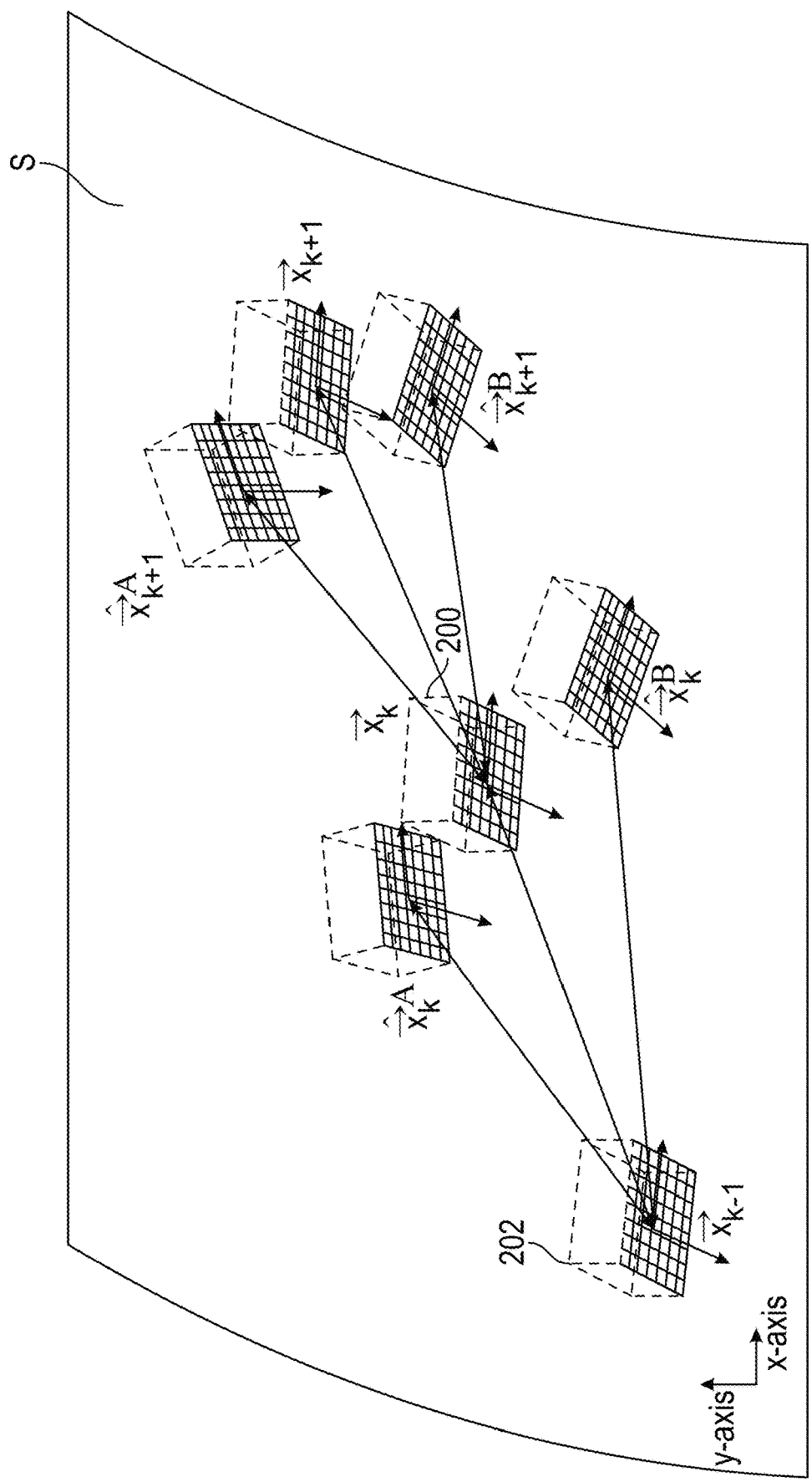
FIG. 2 is a conceptual drawing graphically illustrating a technique to track a position of a probe assembly of a non-destructive inspection system, such as a phase array ultrasonic testing (PAUT) system, relative to the surface of the component being inspected, using various techniques of this disclosure.

FIG. 2 is a conceptual drawing graphically illustrating a technique to track a position of a probe assembly of a non-destructive inspection system, such as a phase array ultrasonic testing (PAUT) system, relative to the surface of the component being inspected, using various techniques of this disclosure. In FIG. 2, a processor, such as the processor 102 of FIG. 1, can determine the position of a probe assembly, such as the probe assembly 150 of FIG. 1, at a position $\vec{x}_k$ from a 2D image 200 using a previous position $\vec{x}_{k-1}$ from another 2D image 202 as well as a first displacement estimate $\vec{x}_k^A$ determined using acoustic data information, such as acquired using the probe assembly 150 of FIG. 1, and a second displacement estimate $\vec{x}_k^B$ determined using IMU information, such as acquired using the IMU sensor 153 of FIG. 1.

The processor can combine, e.g., such as by averaging, the first and second displacement estimates determined using the two types of measurements, e.g., acoustic and IMU. Using the combination, the processor can estimate the motion of the probe assembly and generate, using the estimated motion, a second position of the probe assembly at $\vec{x}_k$. Similarly, the processor can determine another position of the probe assembly at $\vec{x}_{k+1}$ on a surface S.

In some examples, the techniques shown in FIG. 2 can be accomplished using a two-dimensional (2D) matrix array and corrosion mapping, for example. That is, the probe assembly 150 can include a 2D matrix array and the inspection system 100 can generate acoustic images with the 2D matrix array at two consecutive times. The inspection system 100 can determine relevant features (e.g., areas of corrosion, geometrical echo (for welds), grain noise, and volumetric flaws such as cracks, slag, inclusion, and step-wise cracking) common to the acoustic images. The inspection system 100 can estimate the displacement of the probe assembly 150 using features, e.g., areas of corrosion, common to both images. Then, the inspection system 100 can use an IMU measurement, such as acquired using the IMU sensor 153 in FIG. 1, to improve the estimate of the displacement of the probe assembly 150.

In other examples, the techniques shown in FIG. 2 can be accomplished using a linear array and by using synthetic aperture focusing technique (SAFT) principles. An inspection system, such as the inspection system 100 of FIG. 1, can perform an acoustic acquisition technique called a "total focusing method" (TFM), such as involving a full-matrix capture (FMC) acquisition scheme where focus can be achieved across a broad spatial region on or within a structure under test. As an example, the probe assembly 150 can include a linear array and the processor 102 can acquire FMC data using the linear array along a scan axis. The processor can use an IMU measurement, such as acquired using the IMU sensor 153 in FIG. 1, to estimate the displacement between two consecutive acquisitions.

In either the two-dimensional (2D) matrix array and feature mapping implementation or the linear array and SAFT, a position of the probe assembly can be determined using measurements or by using measurement and prediction. These implementations are described in detail below.

FIGS. 3A-3F graphically depict an example of estimating a position of a probe assembly of an NDT system using a two-dimensional (2D) matrix array and corrosion mapping. The probe assembly, such as the probe assembly 150 of FIG. 1, can be positioned on a material having an unspecified surface and in communication with an IMU sensor, such as the IMU sensor 153 of FIG. 1.

Figure 3A:
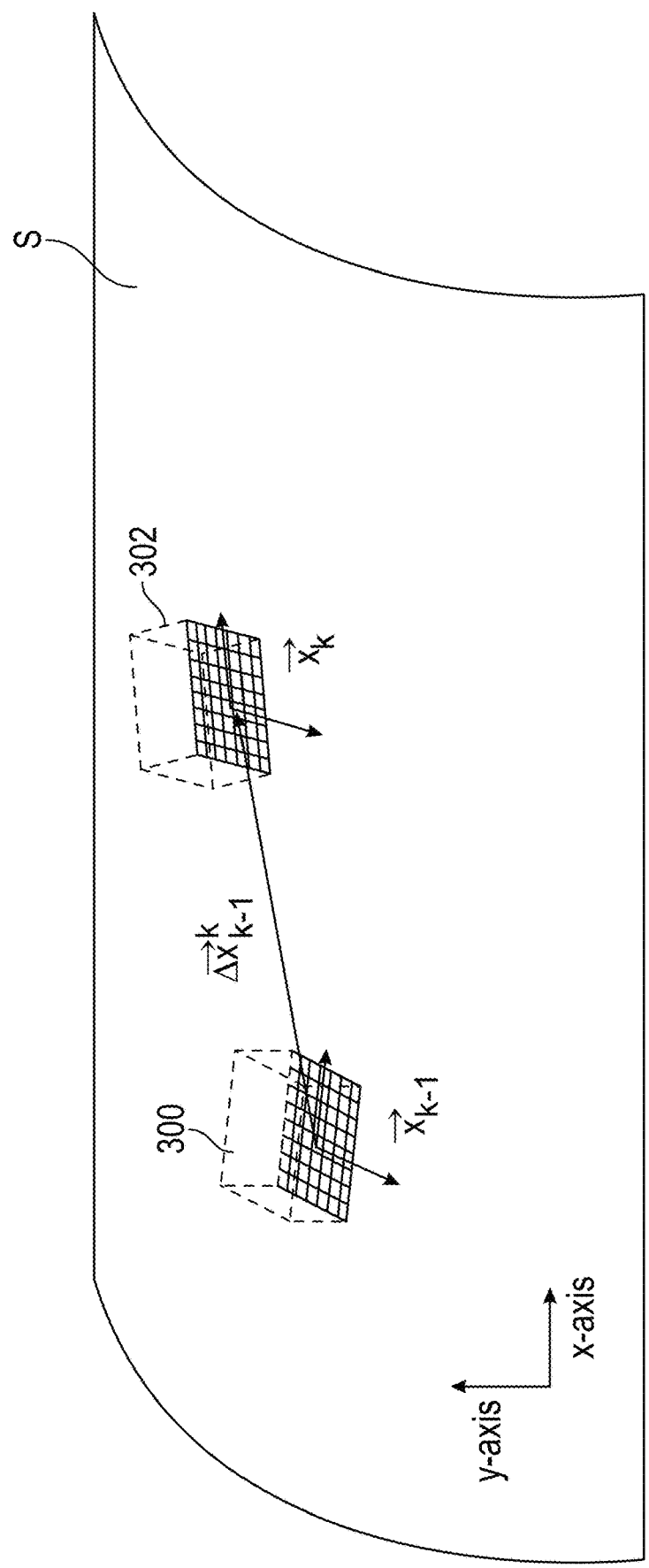
FIGS. 3A-3F graphically depict an example of estimating a position of a probe assembly of a non-destructive inspection system using a two-dimensional (2D) matrix array and corrosion mapping.

FIG. 3A is a conceptual drawing graphically illustrating an estimation of a position of a probe movement of a probe assembly using a 2D acoustic image acquired from a first position of the probe assembly and a 2D acoustic image acquired from a second position of the probe assembly. The probe assembly can be positioned on a material having a surface S and in communication with an IMU sensor.

A first 2D acoustic image 300 can be acquired at position $\vec{x}_{k-1}$ and a second 2D acoustic image 302 can be acquired at position $\vec{x}_k$. Using acquired acoustic image data and IMU sensor measurement data, a processor, such as the processor 102 of FIG. 1 can determine the change $\vec{x}_{k-1}{}^k$ between the two positions.

Figure 3B:
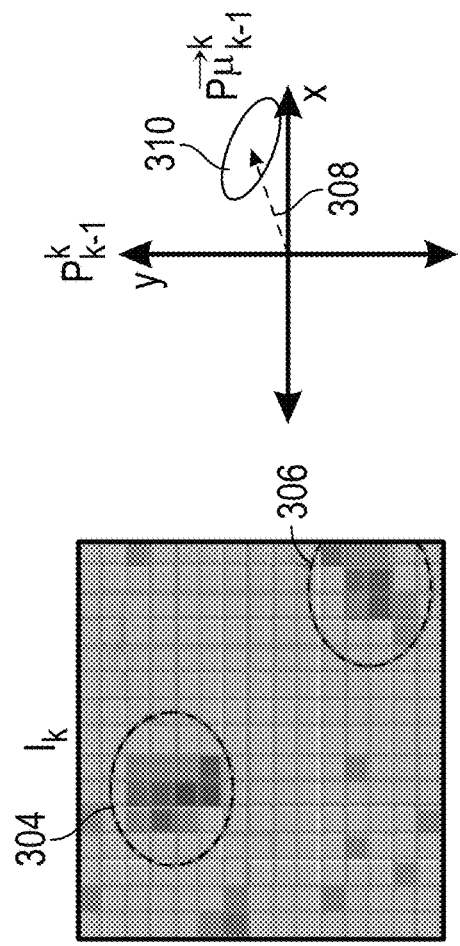

FIG. 3B depicts an example of a first acoustic data signal, e.g., a first 2D acoustic image, acquired at a first position of the probe assembly. In particular, FIG. 3B depicts a 2D corrosion image $I_{k=0}$ having an initial state $\vec{x}_{k=0}$ and where the IMU sensor 153 is zeroed such that $\vec{z}_{k=0}{}^B=0$. Each square in FIG. 3B can represent a pixel. Patches of corrosion in the material are shown, where darker pixels indicate thinner material. In other examples, features other than corrosion can be used. The processor, such as the processor 102 of FIG. 1, can determine a value that can represent an amount of the corrosion in each pixel in the image. Examples of patches of corrosion are shown at 304 and 306.

Figure 3C:
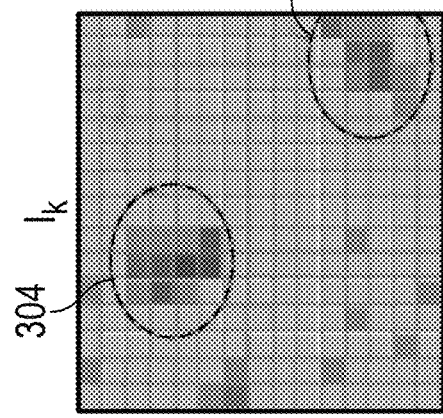

FIG. 3C depicts an example of a second acoustic data signal, e.g., a second 2D acoustic image, acquired at a second position of the probe assembly. In particular, FIG. 3C depicts a 2D image $I_k$ with corrosion patches. The patches of corrosion 304, 306, which are common to both FIG. 3B and FIG. 3C, have moved in FIG. 3C relative to FIG. 3B. In some examples, the processor can use edge or corner detection techniques to track the movement of the features, such as the patches of corrosion. The processor can estimate the motion of the probe assembly using the images from FIGS. 3B and 3C.

Figure 3D:
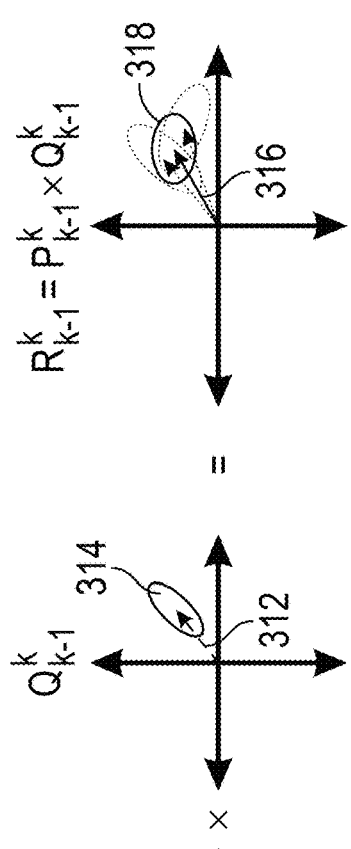

FIG. 3D graphically depicts a probability density function (PDF) describing the motion probability of the probe assembly in the x-y direction. Using Equation 1 below, the processor can perform a 2D convolution of the two images from FIGS. 3B and 3C to determine a first PDF of a first displacement probability from the acoustic data.

$$P_{k-}{}^k = f(I_{k-1} * I_k) \quad \text{Equation 1:}$$

where $\vec{P}_{k-1}{}^k$ is a 2D PDF describing the motion probability of the probe assembly in the x-y direction, $I_{k-1}$ is the image in FIG. 3B, $I_k$ is the image in FIG. 3C, and the symbol * represents the mathematical operation of convolution.

In FIG. 3D, the arrow 308 represents an estimated motion of the probe assembly, and the ellipse 310 represents a confidence interval. The PDF can be a Normal distribution with mean $\vec{\mu}$ and variance $\Sigma$, for example.

As mentioned above, IMU sensor measurements can be used to improve the estimation of the position of the probe assembly. The processor can acquire new IMU sensor measurements $\vec{z}_k{}^B$.

Figure 3E:
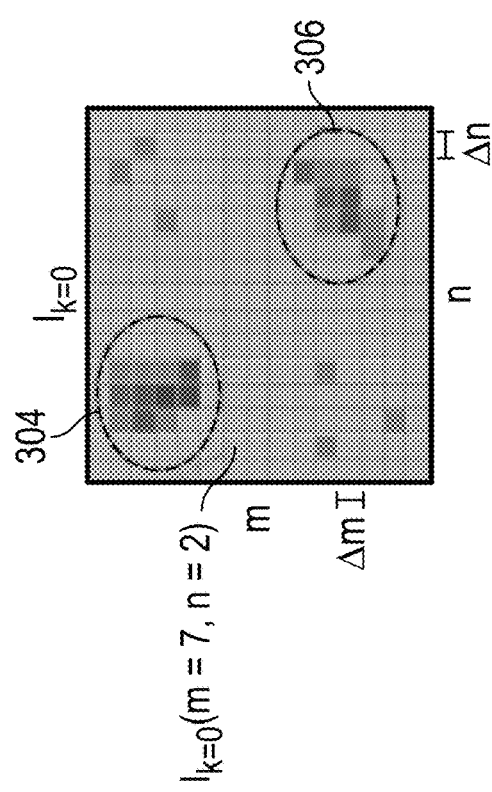

FIG. 3E graphically depicts a probability density function (PDF) of the motion of the probe assembly in the x-y direction determined using an IMU sensor measurement. In FIG. 3E, the arrow 312 represents the estimated motion of the probe assembly determined using the IMU sensor, and the ellipse 314 represents the confidence interval. In FIG. 3E, $\vec{Q}_{k-1}{}^k$ is a 2D PDF describing the motion probability of the probe assembly in the x-y direction computed using the IMU sensor measurement. The PDF can be a Normal distribution with mean $\vec{\mu}$ and variance $\Sigma$, for example. In this manner, the processor can determine a second PDF using the IMU sensor, but for the same probe motion as the first PDF (from the acoustic data).

Figure 3F:
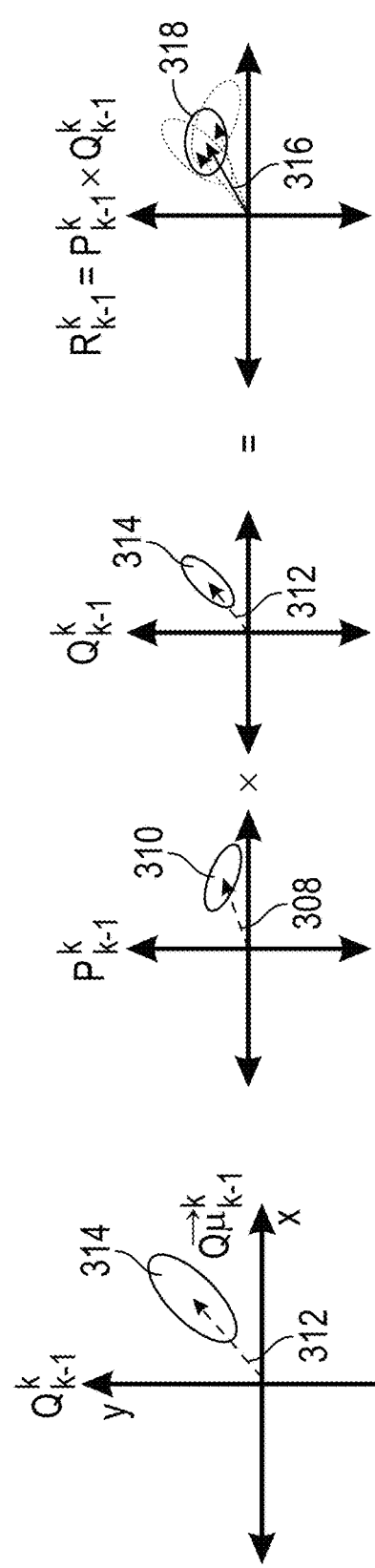

FIG. 3F is a conceptual drawing graphically illustrating the estimation of the probe assembly from a first position to a second position. The processor can then combine the motion estimate $\vec{P}_{k-1}{}^k$ from FIG. 3D and the motion estimate $\vec{Q}_{k-1}{}^k$ from FIG. 3E, such as by multiplying the PDFs and normalizing the results. As seen in FIG. 3F, the combined estimate is as follows:

$$\vec{R}_{k-1}{}^k = \vec{P}_{k-1}{}^k \times \vec{Q}_{k-1}{}^k.$$

In FIG. 3F, the arrow 316 and the ellipse 318 represent the merged PDF of the IMU sensor and the acoustic data. The arrow 316 represents the estimated motion of the probe assembly and the ellipse 318 represents the confidence interval.

In some examples, the techniques shown in FIGS. 3A-3F can be repeated for each indication (such as 304 and 306 in FIGS. 3B and 3C) individually. The PDF obtained for each indication can then be merged in the same way as the PDF $\vec{P}_{k-1}{}^k$ and $\vec{Q}_{k-1}{}^k$.

The processor can end the scan of the material, such as by a time out or after using every pixel, for example.

Figure 4:
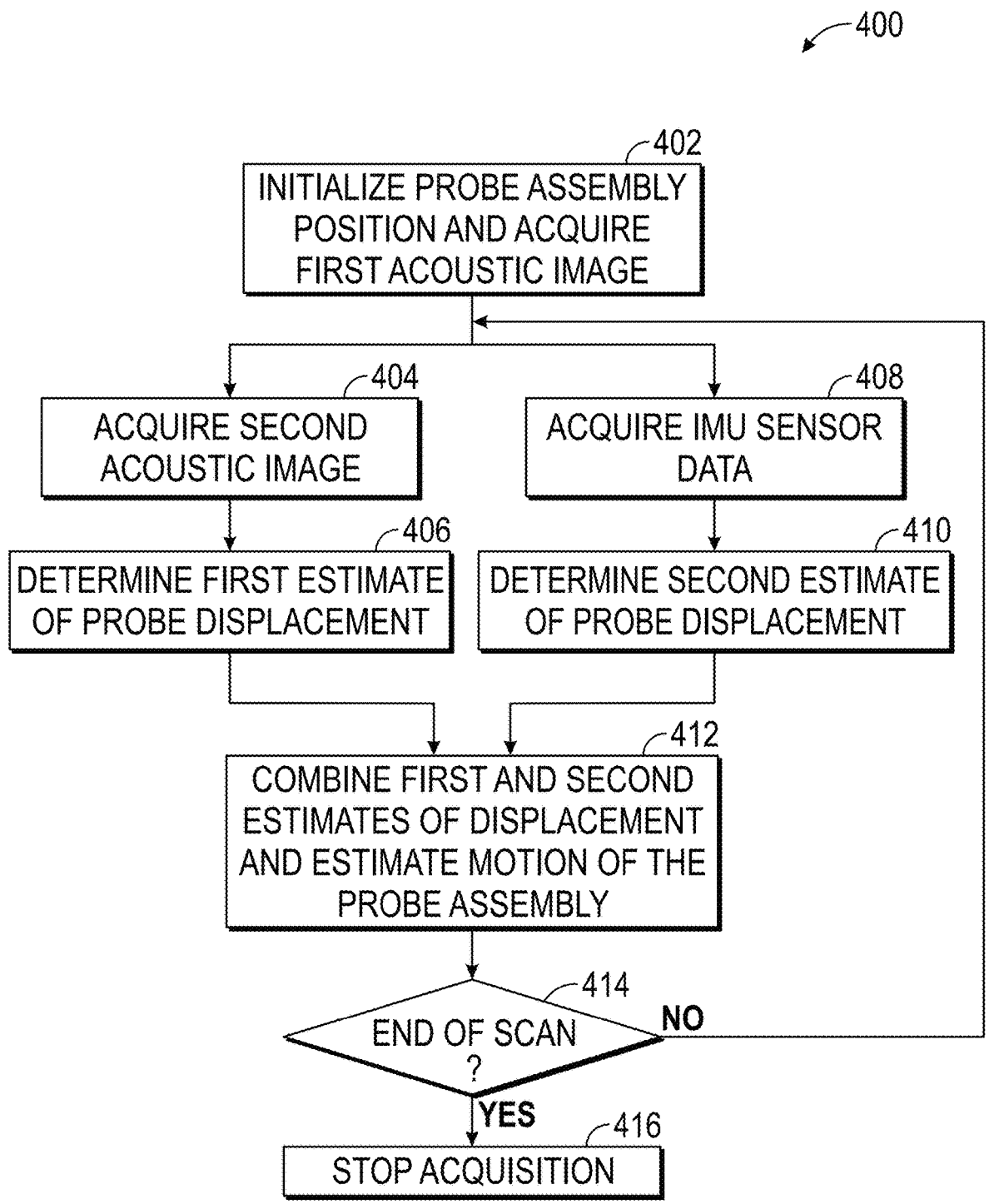
FIG. 4 is a flow diagram depicting an example of estimating a position of a probe assembly of a non-destructive inspection system using a two-dimensional (2D) matrix array and feature mapping, such as corrosion, without prediction.

FIG. 4 is a flow diagram 400 depicting an example of estimating a position of a probe assembly of a non-destructive inspection system using a two-dimensional (2D) matrix array and feature mapping, such as corrosion, without prediction. At block 402, the processor can initialize the probe assembly, such as having an initial position $\vec{x}_{k=0}$ and an initial PDF $\Sigma_{k=0}$. At the initial position, the processor can acquire a first acoustic data signal, e.g., a first acoustic image, of the material using the probe assembly 150 of FIG. 1.

At block 404, such as after a time step k=k+1, the processor can acquire a second acoustic data signal, e.g., a second acoustic image, of the material.

At block 406, the processor can determine a first estimate of a displacement of the probe assembly between the first and second positions using the first and second acoustic data signals. For example, the processor can determine a first PDF that can include the estimated motion $\Delta_k^A$ of the probe assembly and its confidence interval, namely the co-variance matrix $\Sigma_k^A$.

At block 408, such as after the time step k=k+1, the processor can acquire IMU sensor data, such as using the IMU sensor 153 of FIG. 1.

At block 410, the processor can determine a second estimate of the displacement of the probe assembly between the first and second positions using a signal from the IMU sensor. For example, the processor can determine a second PDF that can include the estimated motion $\Delta_k^B$ of the probe assembly and its confidence interval, namely the co-variance matrix $\Sigma_k^B$.

At block 412, the processor can combine the first and second estimates of displacements and estimate, using the combination, a motion of the probe assembly. For example, the processor can combine the motion and PDF estimates from the acoustic data and IMU sensor data using Equations 2 and 3 below:

$$\vec{x}_k = \vec{x}_{k-1} + \frac{\sum_k^B \Delta_k^A + \sum_k^A \Delta_k^B}{\sum_k^A + \sum_k^B} \quad \text{Equation 2}$$

$$\sum_k = \sum_{k-1} + \frac{\sum_k^A \sum_k^B}{\sum_k^A + \sum_k^B} \quad \text{Equation 3}$$

As seen in the denominators in Equations 2 and 3, if the precision of the estimate $\Sigma_k^A$ from an acoustic image is low, more weight is given to the IMU sensor data. Using Equations 2 and 3, the processor can generate the second state $\vec{x}_k$ of the probe assembly as well as the PDF $\Sigma_k$. In this disclosure, the state of the probe assembly can include the position, orientation velocity, and/or acceleration.

At decision block 414, the processor can determine whether to end the scan. For example, the processor can determine whether a timer has timed out, whether the region of interest has been inspected, and/or whether the positioning measurement is sufficiently precise, e.g., $\Sigma_k$ is greater than or equal to a threshold of confidence. If the processor determines that the scan should continue ("NO" branch of block 414), the processor can increment the time step k and acquire a new acoustic image and new IMU data at blocks 404 and 408. If the processor determines that the scan should not continue ("YES" branch of block 414), the processor can stop acquisition at block 416.

It should be noted that although the acquisition of the acoustic image data and IMU sensor data is shown in parallel in FIG. 4, in some examples, the acquisition of acoustic image data and IMU sensor data can be performed sequentially.

Figure 5:
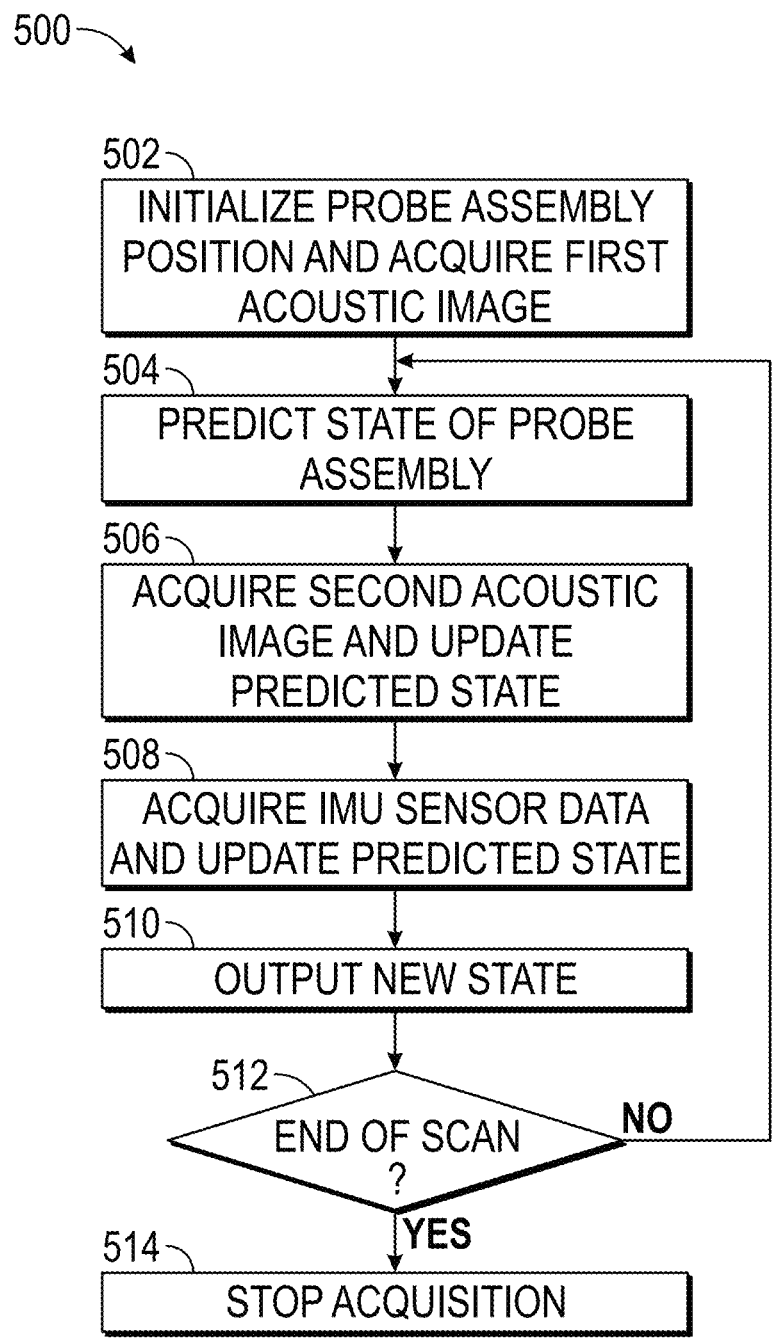
FIG. 5 is a flow diagram depicting an example of estimating a position of a probe assembly of a non-destructive inspection system using a two-dimensional (2D) matrix array and corrosion mapping, with prediction.

In some example implementations, a predication step can be included, such as described with respect to FIG. 5, to predict a state of the probe assembly. For example, a processor, such as the processor 102 of FIG. 1, can use a Bayes filter to perform the prediction. The Bayes filter can include a Kalman filter, such as a linear Kalman filter, an extended Kalman filter, or an unscented Kalman filter. Although described in this disclosure with respect to a linear Kalman filter, other Bayes filters can be used and are considered within the scope of this disclosure.

FIG. 5 is a flow diagram 500 depicting an example of estimating a position of a probe assembly of an NDT system using a two-dimensional (2D) matrix array and corrosion mapping, with prediction. At block 502, the processor can initialize the probe assembly, such as having an initial (or first) state $\vec{x}(k)$, such as including a position x(k) and a velocity $\dot{x}(k)$, as shown in Equation 4 below:

$$\vec{x}(k) = \begin{bmatrix} x(k) \\ \dot{x}(k) \end{bmatrix} \quad \text{Equation 4}$$

In addition, the initial state of the probe assembly can include a covariance matrix, such as shown in Equation 5 below:

$$P(k) = \begin{bmatrix} \sum_{kx} & \sum_{k\dot{x}} \\ \sum_{kx} & \sum_{k\dot{x}} \end{bmatrix} \quad \text{Equation 5}$$

where $\Sigma$ represents a co-variance matrix of a PDF. At the initial position, the processor can acquire a first acoustic data signal, e.g., a first acoustic image, of the material using the probe assembly 150 of FIG. 1.

At block 504, such as after a time step k=k+1, the processor, such as the processor 102 of FIG. 1, can predict a second state of the probe assembly. For example, the processor can predict a second state, such as including a position and/or orientation, using previously determined motion components, such as using a physical model of system motion. For example, the processor can use a state model A (a physical model of system motion) to predict the state at time k+1 using information from the previous time k. The state model A represents a set of equations that allows the computation of the state at k+1, from the variable at k. The processor can predict the second state using previously determined motion components, such as predetermined speed, predetermined direction, and a sampling rate, e.g., 60 Hertz, using Equations 6 and 7 below.

The state x of the probe assembly at the second position is given by Equation 6:

$$\vec{x}(k|k-1) = A\vec{x}(k-1)$$

where A is the state model, such as input by the user, $\vec{x}(k)$ is the estimate of the variable x, (k|k−1) represents at timestep k, knowing its value at timestep k−1, and $\hat{\vec{x}}(k|k-1)$ corresponds to the estimate of state x at timestep k, knowing state x at timestep k−1. The covariance P is given by Equation 7:

$$\vec{P}(k|k-1) = AP(k-1)A^T + Q$$

where A is the state model, such as input by the user, $A^T$ is the transpose matrix of A, and Q is the state model noise, such as input by the user.

At block 506, the processor can acquire a second acoustic data signal, e.g., a second acoustic image, of the material. The processor can use an inverse of the acoustic sensor model ($H_A$) such as input by the user, to update the predicted state $\hat{\vec{x}}(k|k-1)$ with the second acoustic measurement $\vec{z}_A(k)$ using Equations 8-12 below:

Equation 8 is given by:

$$\vec{y}_A(k) = \vec{z}_A(k) - (H_A\hat{\vec{x}}(k|k-1)) \quad \text{Innovation:}$$

where $(H_A\hat{\vec{x}}(k|k-1))$ represents the measurement if the predicted state was correct. The innovation (or residual) represents a difference between the predicted state and state determined by the acoustic measurement $\vec{z}_A(k)$.

Equation 9 is given by:

$$S(k|k-1,\vec{z}_A(k)) = (H_A\vec{P}(k|k-1)H_A^T) + R_A \quad \text{Variance Update:}$$

where the variance S is updated using the previously obtained covariance P modified by the inverse of the acoustic sensor model ($H_A$), the transpose matrix of $H_A$ ($H_A^T$), and the acoustic sensor noise model $R_A$, such as input by the user.

Equation 10 is given by:

$$K_A(k) = \vec{P}(k|k-1)H_A S(k|k-1,\vec{z}_A(k)) \quad \text{Kalman Gain Matrix:}$$

where the Kalman gain matrix $K_A(k)$ is the product of the covariance matrix P, the inverse of the acoustic sensor model ($H_A$), and the variance S.

Equation 11 is given by:

$$\hat{\vec{x}}(k|k-1,\vec{z}_A(k)) = \hat{\vec{x}}(k|k-1) + K_A(k)\vec{y}_A(k) \quad \text{Update State Prediction:}$$

The predicted state $\hat{\vec{x}}(k|k-1)$ from Equation 6 is updated by adding the Kalman gain matrix $K_A(k)$ multiplied by the innovation y.

Equation 12 is given by:

$$\vec{y}_B(k|k-1,\vec{z}_A(k)) = (I - K_A(k)H_A)\vec{P}(k|k-1) \quad \text{Update Covariance Matrix:}$$

The predicted covariance P from Equation 7 is updated using the identity matrix I, the Kalman gain matrix $K_A(k)$, and the inverse of the acoustic sensor model ($H_A$).

Next, the IMU sensor data can be acquired. At block 508, the processor can acquire IMU sensor data and determine a second estimate of the displacement of the probe between the first and second positions using a signal from the IMU sensor and a physical model. Using Equations 13-17, which are similar to Equations 8-12, the processor can update the predicted state determined by Equation 11.

Equation 13 is given by:

$$\vec{y}_B(k) = \vec{z}_B(k) - (H_B\hat{\vec{x}}(k|k-1,\vec{z}_A(k))) \quad \text{Innovation:}$$

where an IMU sensor model $H_B$, such as input by the user, can update the predicted state determined by Equation 11. The innovation y is the difference between the IMU sensor measurement $\vec{z}_B(k)$ and the updated predicted state term.

Equation 14 is given by:

$$S(k|k-1,\vec{z}_A(k),\vec{z}_B(k)) = (H_B\vec{P}(k|k-1,\vec{z}_A(k))H_B^T) + R_B \quad \text{Variance Update:}$$

where the variance S is updated using the previously obtained covariance P modified by the inverse of the IMU sensor model ($H_B$), the transpose matrix of $H_B$ ($H_B^T$), and the IMU sensor noise model $R_B$, such as input by the user.

Equation 15 is given by:

$$K_B(k) = \vec{P}(k|k-1,\vec{z}_A(k))H_B \\ S(k|k-1,\vec{z}_A(k),\vec{z}_B(k)) \quad \text{Kalman Gain Matrix:}$$

where the Kalman gain matrix $K_B(k)$ is the product of the covariance matrix P, the inverse of the IMU sensor model ($H_B$), and the updated variance S.

Equation 16 is given by:

$$\hat{\vec{x}}(k|k-1,\vec{z}_A(k),\vec{z}_B(k)) = \hat{\vec{x}}(k|k-1,\vec{z}_A(k)) + K_B(k)\vec{y}_B(k) \quad \text{Update State Prediction:}$$

The predicted state $\hat{\vec{x}}(k|k-1,\vec{z}_A(k))$ from Equation 11 is updated by adding the Kalman gain matrix $K_B(k)$ multiplied by the innovation y.

Equation 17 is given by:

$$\vec{P}(k|k-1,\vec{z}_A(k),\vec{z}_B(k)) = (I - K_B(k)H_B)\vec{P}(k|k-1,\vec{z}_A(k)) \quad \text{Update Covariance Matrix:}$$

The predicted covariance P from Equation 12 is updated using the identity matrix I, the Kalman gain matrix $K_B(k)$, and the inverse of the IMU sensor model ($H_B$).

Using the equations above, including Equations 16 and 17, the processor can predict the second position using the previously determined motion components $\vec{z}_A(k)$ and $\vec{z}_B(k)$ and can combine the first and second estimates of displacement and can estimate, using the combination, a motion of the probe assembly.

At block 510, the processor can generate, using the estimated motion, the second state of the probe assembly and output the second state. For example, the processor can output the second state using the state prediction of Equation 16 and the covariance matrix of Equation 17.

At decision block 512, the processor can determine whether to end the scan. For example, the processor can determine whether a timer has timed out, whether the region of interest has been inspected, and/or whether the positioning measurement is sufficiently precise, e.g., $\Sigma_k$ is greater than or equal to a threshold of confidence. If the processor determines that the scan should continue ("NO" branch of block 512), the processor can increment the time step k and perform a new prediction at block 504 and continue with the flow diagram 500 as describe above. If the processor determines that the scan should not continue ("YES" branch of block 512), the processor can stop acquisition at block 514.

It should be noted that although the acquisition of the acoustic image data was performed prior to acquisition IMU sensor data in FIG. 5, in some examples, the acquisition of acoustic image data can be performed after acquisition of the IMU sensor data.

Figure 6:
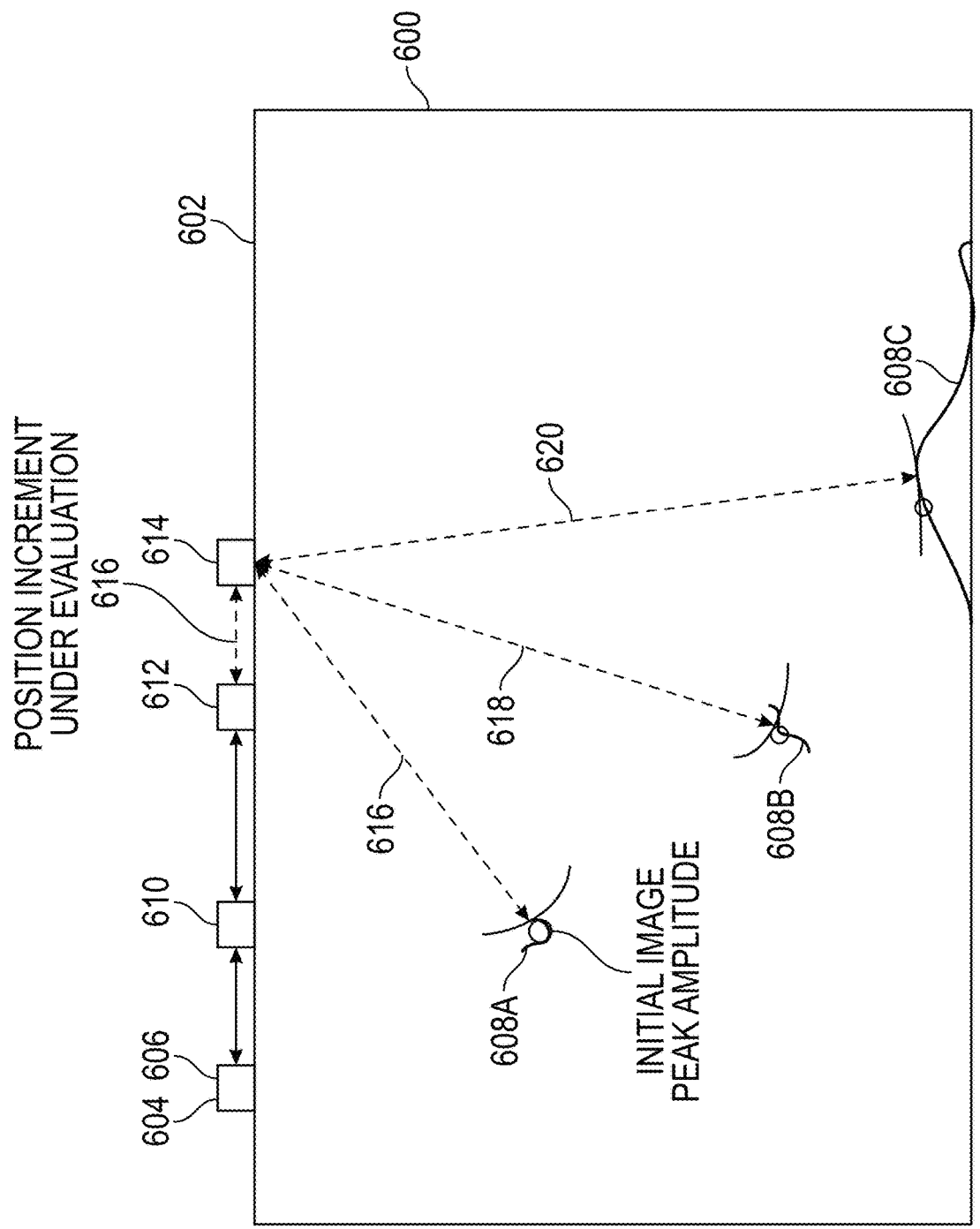
FIG. 6 is a conceptual diagram illustration an example of using SAFT principles to track a position of a probe assembly of a non-destructive inspection system, such as a phase array ultrasonic testing (PAUT) system, relative to the surface of the component being inspected using various techniques of this disclosure.

As mentioned above, the techniques shown in FIG. 2 can be accomplished by using a two-dimensional (2D) matrix array and corrosion mapping, such as described in FIGS. 3A-3F, or by using a linear array probe assembly in communication with an IMU sensor and by using SAFT principles, such as shown in FIG. 6.

FIG. 6 is a conceptual diagram illustration an example of using SAFT principles to track a position of a probe assembly of a non-destructive inspection system, such as a phase array ultrasonic testing (PAUT) system, relative to the surface of the component being inspected using various techniques of this disclosure. A material 600 having a surface 602 is shown in FIG. 6. A probe assembly 604, such as a linear array probe assembly, is shown at a first position 606. The probe assembly 604 can be an example of the probe assembly 150 of FIG. 1. The probe assembly 604 can be in communication with an IMU sensor, such as the IMU sensor 153 in FIG. 1.

Features 608A-608C, such as flaws, geometrical echoes (for welds), grain noises, and volumetric flaws such as cracks, slag, inclusion, or stepwise cracking, are shown in the material 600. The probe assembly 604 can be moved along the surface 602 of the material 600 to positions 606,

610, 612, and 614. Using various techniques of this disclosure, a processor can determine an estimate of a position of the probe assembly 604 using TOF information and then refine that estimated position using information from the IMU sensor using SAFT techniques.

In SAFT, the transmitted beam is a broad band signal which is sent out in a wide cone of transmission, which can be achieved by a small elevation of the probe elements, such as around half of the wavelength in the wedge of the probe. The broadband nature of the transmitted signal allows direct measurement of the time-of-flight (TOF) or the phase information of the signal, thereby allowing the determination of the range of any reflectors (e.g., changes in acoustical impedance) which cause returning echoes. The arrows 616-620 represent the TOFs at position 614 to the features 608A-608C, respectively.

For each scan position, the processor can determine 3D acoustic image data, such as TFM image data. The 3D acoustic image data can be determined using acoustic data, such as FMC data, in the probe axis and SAFT information in the scan axis. The processor can then determine the acoustic peaks in the determined 3D acoustic image data that correspond to the features 608A-608C, where the features can be any feature that reflects the acoustic signal. Using the determined acoustic peaks, the processor can then acquire the FMC data and IMU data for the new scan position. That is, at a new scan position, the processor can add the new position to the beamforming and determine how much the new position contributes to the amplitude of the acoustic peaks. The processor can then determine the position increment that provides the best overall increase of the peak amplitude, which can be an iterative process based on the IMU estimates. Once the processor has refined the position originally estimated using TOF with the IMU sensor information, the "new" position can become a "previously known position" and can contribute to the new image. The probe assembly can be moved to the next scan position and the process can be repeated.

As graphically depicted in FIG. 6, a user, for example, can move the probe assembly 604 over the first features 608A-608C, and the inspection system, such as the inspection system 100 of FIG. 1, can detect the first features 608A-608C in the acoustic data signal. The TOFs to the first features 608A-608C can vary depending on where the probe assembly 604 is relative to the first features 608A-608C. In FIG. 6, positions 606, 610, and 612 can be "previously known positions" in that their positions have already been refined using IMU sensor data. The processor can acquire, at the first position 612 of the probe assembly, a first acoustic data signal of the material 600. The processor can determine, at the first position 612, a first TOF to a first feature in the material 600 using the first acoustic data signal. In some examples, such as in FIG. 6, the processor can determine more than one TOF at the first position 612 using the first acoustic data signal, such as in FIG. 6 where the three TOFs each correspond to the three first features 608A-608C shown in FIG. 6.

The user can then move the probe assembly 604 to the second position 614 by an unknown position increment 616. The processor can acquire, at the second position 614 of the probe assembly, a second acoustic data signal of the material 600. The processor can determine, at the second position 614, a second TOF to the second feature in the material 600 using the second acoustic data signal. In some examples, the processor can determine more than one TOF at the second position 614 using the second acoustic data signal, such as in FIG. 6 where the three TOFs each correspond to the three second features in the material, where the first and second features are the same features, such as the three features 608A-608C shown in FIG. 6. The second TOFs are represented by arrows 616-620.

The processor can determine 3D acoustic image data, such as TFM image data in the scan axis to determine a match between the first and second TOFs at the corresponding first and second positions 612, 614. The processor can use the data acquired at the previously known positions 606 and 610 to determine the 3D acoustic image data. The 3D acoustic image data can be determined using acoustic data, such as FMC data, in the probe axis and SAFT information in the scan axis, such as using a TFM beamforming process. The processor can then determine the acoustic peaks in the 3D acoustic image data that correspond to the features 608A-608C.

In examples in which the processor determined two or more TOFs at the first position 606 and two or more TOFs at the second position 610, the processor can determine a first estimate of the displacement of the probe assembly based on a difference between the plurality of first TOFs at the first position and the plurality of second TOFs at the second position, such as using an average of the plurality of the first and second TOFs. For example, each TOF can have its own signature so the processor can compare corresponding TOFs.

To refine the first estimate of the displacement of the probe assembly determined using TOF, the processor can use IMU sensor data acquired using the IMU sensor. For example, the processor can determine a second estimate of the displacement of the probe assembly 604 between the first and second positions 612, 614 using a signal from the IMU sensor. As an example, the processor can include the data from the new position 614 into the beamformed image. Then, the processor can determine the second estimate of the displacement of the probe assembly, e.g., the position increment 616 in FIG. 6, by determining the position that maximizes an increase in the amplitude of the acoustic peaks in the determined 3D acoustic image data that correspond to the features 608A-608C. The processor can then combine the first and second estimates of displacement, such as by averaging or by using another central tendency, and estimate, using the combination, a motion of the probe assembly. The processor can then generate, using the estimated motion, the second position of the probe assembly.

By using the techniques of FIG. 6, the IMU sensor and SAFT principles can complement one another to provide an estimate of a current location of the probe assembly.

Figure 7:
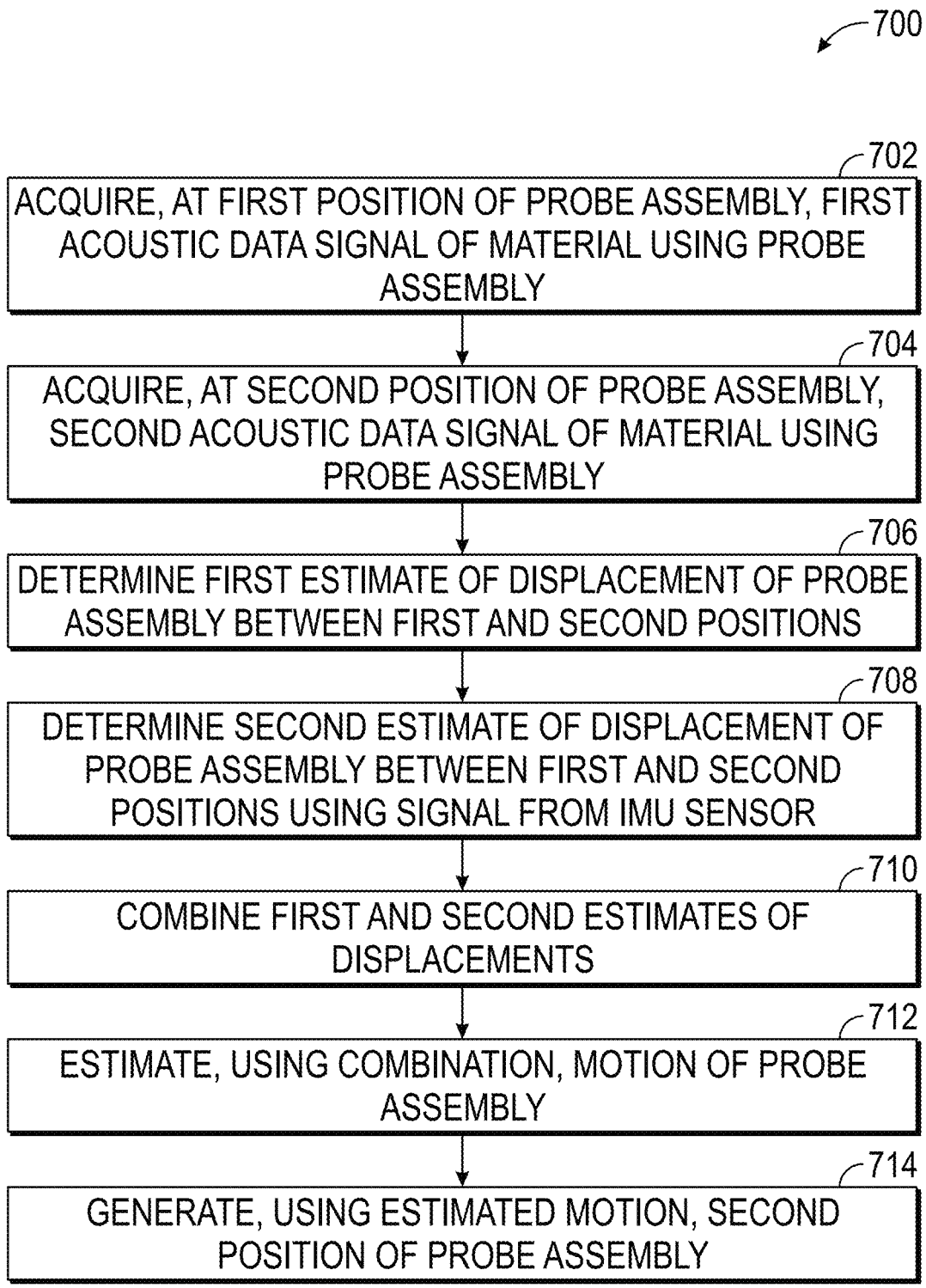
FIG. 7 is a flow diagram depicting an example of estimating a position of a probe assembly of an NDT system using an ultrasonic probe array positioned on a material and in communication with an IMU sensor, in accordance with this disclosure.

FIG. 7 is a flow diagram depicting an example of estimating a position of a probe assembly of an NDT system using an ultrasonic probe array positioned on a material and in communication with an IMU sensor, in accordance with this disclosure. The flow diagram 700 shown in FIG. 7 is applicable to techniques that use a two-dimensional (2D) matrix array and corrosion mapping, for example, as well as techniques that use a linear array and SAFT principles, each technique being described above in detail.

At block 702, a processor of an inspection system, such as the processor 102 of the inspection system 100 of FIG. 1, can acquire, at a first position of the probe assembly, a first acoustic data signal of the material using the probe assembly. At block 704, the processor can acquire, at a second position of the probe assembly, a second acoustic data signal of the material using the probe assembly;

At block 706, the processor can determine a first estimate of a displacement of the probe assembly between the first and second positions using the first and second acoustic data signals, which, in some examples, can include determining a first probability density function of a first displacement probability.

At block 708, the processor can determine a second estimate of the displacement of the probe assembly between the first and second positions using a signal from the IMU sensor and, in some examples, using a physical model of system motion, such as including a previously determined speed, a previously determined direction, and a sampling rate. In some examples, the processor can determine the second estimate by determining a second probability density function of a second displacement probability.

At block 710, the processor can combine the first and second estimates of displacements.

At block 712, the processor can estimate, using the combination, a motion of the probe assembly.

At block 714, the processor can generate, using the estimated motion, the second position of the probe assembly.

In some examples, such as when using 2D matrix array probe assembly, the processor can generate a first acoustic image using the first acoustic data signal and generate a second acoustic image using the second acoustic data signal. The processor can then determine the first estimate of the displacement of the probe assembly between the first and second positions using a feature common to both the first and second acoustic images. In some examples, the material under test can include a metal pipe and the feature can include corrosion.

In some examples, such as when using a linear array with SAFT, the processor can determine, at the first position, a first time-of-flight (TOF) to a feature in the material using the first acoustic data signal, and can determine, at the second position, a second TOF to the feature in the material using the second acoustic data signal. The processor can then determine the first estimate of the displacement of the probe assembly between the first and second positions using the first TOF and the second TOF.

In some examples, such as when using a linear array with SAFT, the processor can determine, at the first position, a plurality of first time-of-flights corresponding to individual ones of a plurality of first features in the material using the first acoustic data signal, and can determine, at the second position, a plurality of second time-of-flights corresponding to individual ones of a plurality of second features in the material using the second acoustic data signal.

The processor can determining the first estimate of the displacement of the probe assembly between the first and second positions using the first and second acoustic data signals by determining the first estimate of the displacement of the probe assembly based on the plurality of first time-of-flights and determining the second estimate of the displacement of the probe assembly based on the plurality of second time-of-flights.

In some examples, a prediction step can be included. For example, the processor can predict the second position using previously determined motion components and combine the first and second estimates of displacements by combining the first and second estimates of displacement and the predicted second position. For example, the processor can predict the second position using a physical model of system motion, such as using a previously determined speed, a previously determined direction, and a sampling rate.

Figure 8:
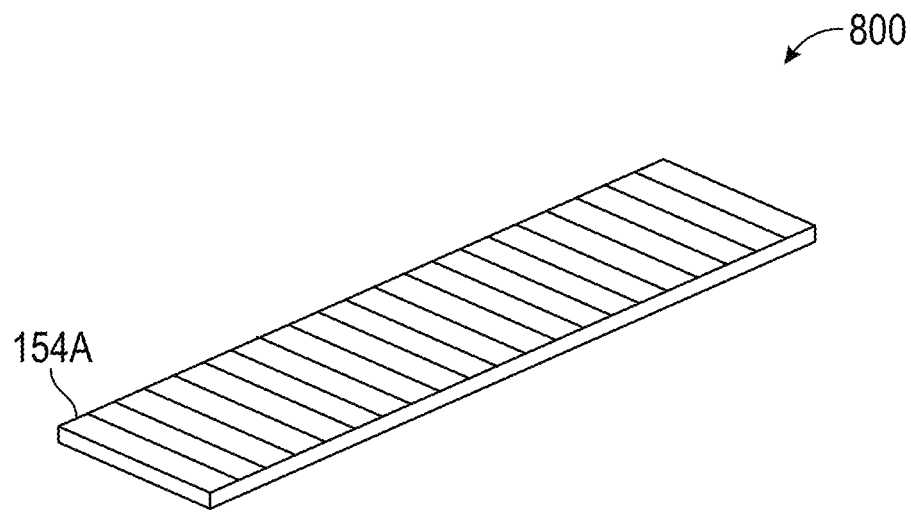
FIG. 8 is an example of a linear array that can be used to implement various techniques of this disclosure. The linear array 800 shown can form part of the transducer array 152 of FIG. 1.

FIG. 8 is an example of a linear array that can be used to implement various techniques of this disclosure. The linear array 800 shown can form part of the transducer array 152 of FIG. 1.

Figure 9:
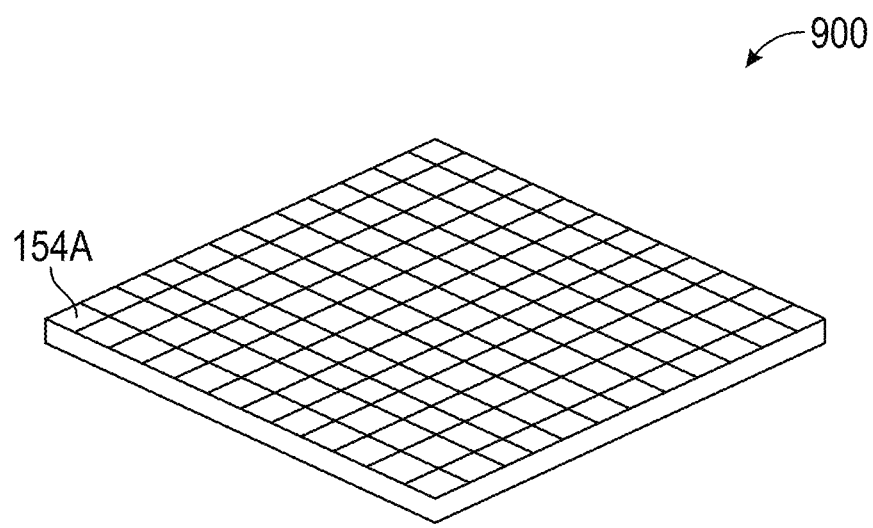
FIG. 9 is an example of a two-dimensional (2D) matrix array that can be used to implement various techniques of this disclosure. The two-dimensional (2D) matrix array 900 shown can form part of the transducer array 152 of FIG. 1.

FIG. 9 is an example of a two-dimensional (2D) matrix array that can be used to implement various techniques of this disclosure. The two-dimensional (2D) matrix array 900 shown can form part of the transducer array 152 of FIG. 1.

VARIOUS NOTES

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined with reference to the appended aspects, along with the full scope of equivalents to which such aspects are entitled.

The claimed invention is:

1. A method of estimating a position of a probe assembly of a non-destructive inspection system, the probe assembly positioned on a material and in communication with an inertial measurement unit (IMU) sensor, the method comprising:
   acquiring, at a first position of the probe assembly, a first acoustic data signal of the material using the probe assembly;
   acquiring, at a second position of the probe assembly, a second acoustic data signal of the material using the probe assembly;
   determining a first estimate of a displacement of the probe assembly between the first and second positions using the first and second acoustic data signals;
   determining a second estimate of the displacement of the probe assembly between the first and second positions using a signal from the IMU sensor;
   combining the first and second estimates of displacements;
   estimating, using the combination, a motion of the probe assembly;
   generating, using the estimated motion, the second position of the probe assembly; and
   displaying an image that represents the acquired acoustic data signals.

2. The method of claim 1, wherein determining the first estimate of the displacement of the probe assembly includes determining a first probability density function of a first displacement probability, and
   wherein determining the second estimate of the displacement of the probe assembly includes determining a second probability density function of a second displacement probability.

3. The method of claim 1, further comprising:
   generating a first acoustic image using the first acoustic data signal; and
   generating a second acoustic image using the second acoustic data signal,
   wherein determining the first estimate of the displacement of the probe assembly between the first and second positions using the first and second acoustic data signals includes:
      determining the first estimate of the displacement of the probe assembly between the first and second positions using at least one feature common to both the first and second acoustic images.

4. The method of claim 3, wherein the material is a pipe, and wherein the feature includes corrosion.

5. The method of claim 1, comprising:
   determining, at the first position, a first time-of-flight (TOF) to a feature in the material using the first acoustic data signal; and
   determining, at the second position, a second TOF to the feature in the material using the second acoustic data signal, and
   wherein determining the first estimate of the displacement of the probe assembly between the first and second positions using the first and second acoustic data signals includes:
      determining the first estimate of the displacement of the probe assembly between the first and second positions using the first TOF and the second TOF.

6. The method of claim 1, further comprising:
   determining, at the first position and using the first acoustic data signal, a plurality of first time-of-flights that each correspond to a plurality of first features in the material; and
   determining, at the second position and using the second acoustic data signal, a plurality of second time-of-flights that each correspond to a plurality of second features in the material,
   wherein the second features are the same as the first features, and
   wherein determining the first estimate of the displacement of the probe assembly between the first and second positions using the first and second acoustic data signals includes:
      determining the first estimate of the displacement of the probe assembly using a difference between the plurality of first time-of-flights and the second time-of-flights.

7. The method of claim 1, further comprising:
   predicting the second position,
   wherein combining the first and second estimates of displacements includes combining the first and second estimates of displacement and the predicted second position.

8. The method of claim 7, wherein predicting the second position includes:
   predicting the second position using a previous system state and a physical model of system motion.

9. The method of claim 8, wherein predicting the second position using the physical model of system motion includes:
   predicting the second position using a previously determined speed, a previously determined direction, and a sampling rate.

10. An ultrasound inspection system for estimating a position of an ultrasonic probe assembly of a non-destructive inspection system, the system comprising:
   the ultrasonic probe assembly to be positioned on a material and in communication with an inertial measurement unit (IMU) sensor; and
   a processor configured to:
      acquire, at a first position of the probe assembly, a first acoustic data signal of the material using the probe assembly;
      acquire, at a second position of the probe assembly, a second acoustic data signal of the material using the probe assembly;

determine a first estimate of a displacement of the probe assembly between the first and second positions using the first and second acoustic data signals;

determine a second estimate of the displacement of the probe assembly between the first and second positions using a signal from the IMU sensor;

combine the first and second estimates of displacements;

estimate, using the combination, a motion of the probe assembly;

generate, using the estimated motion, the second position of the probe assembly; and display an image that represents the acquired acoustic data signals.

11. The system of claim 10, wherein the processor configured to determine the first estimate of the displacement of the probe assembly is configured to determine a first probability density function of a first displacement probability, and wherein the processor configured to determine the second estimate of the displacement of the probe assembly is configured to determine a second probability density function of a second displacement probability.

12. The system of claim 10, wherein the processor is configured to:

generate a first acoustic image using the first acoustic data signal; and generate a second acoustic image using the second acoustic data signal, wherein the processor configured to determine the first estimate of the displacement of the probe assembly between the first and second positions using the first and second acoustic data signals is configured to:

determine the first estimate of the displacement of the probe assembly between the first and second positions using at least one feature common to both the first and second acoustic images.

13. The system of claim 12, wherein the material is a pipe, and wherein the feature includes corrosion.

14. The system of claim 10, the processor configured to:

determine, at the first position, a first time-of-flight (TOF) to a feature in the material using the first acoustic data signal; and determine, at the second position, a second TOF to the feature in the material using the second acoustic data signal, wherein the processor configured to determine the first estimate of the displacement of the probe assembly between the first and second positions using the first and second acoustic data signals is configured to:

determine the first estimate of the displacement of the probe assembly between the first and second positions using the first TOF and the second TOF.

15. The system of claim 10, the processor configured to:

determine, at the first position and using the first acoustic data signal, a plurality of first time-of-flights that each correspond to a plurality of first features in the material; and determine, at the second position and using the second acoustic data signal, a plurality of second time-of-flights that each correspond to a plurality of second features in the material, wherein the second features are the same as the first features, wherein the processor configured to determine the first estimate of the displacement of the probe assembly between the first and second positions using the first and second acoustic data signals is configured to:

determine the first estimate of the displacement of the probe assembly using a difference between the plurality of first time-of-flights and the second time-of-flights.

16. The system of claim 10, the processor configured to:

predict the second position, wherein the processor configured to combine the first and second estimates of displacements is configured to combine the first and second estimates of displacement and the predicted second position.

17. The system of claim 16, wherein the processor configured to predict the second position is configured to:

predict the second position using a previous system state and a physical model of system motion.

18. The system of claim 17, wherein the processor configured to predict the second position using the physical model of system motion is configured to:

predict the second position using a previously determined speed, a previously determined direction, and a sampling rate.

* * * * *